United States Patent [19]

Sato et al.

[11] Patent Number: 4,568,609

[45] Date of Patent: Feb. 4, 1986

[54] LIGHT PERMEABLE CONDUCTIVE MATERIAL

[75] Inventors: Goro Sato, Kita-Kyushu; Michio Komatsu, Onga; Tsuguo Koyanagi; Hirokazu Tanaka, both of Kita-Kyushu, all of Japan

[73] Assignee: Catalysts & Chemicals Industries Co., Ltd., Tokyo, Japan

[21] Appl. No.: 644,841

[22] Filed: Aug. 28, 1984

[30] Foreign Application Priority Data

Aug. 31, 1983 [JP] Japan ............................... 58-159844

[51] Int. Cl.[4] .................. B32B 9/00; B32B 15/02; B32B 19/00
[52] U.S. Cl. .................................... 428/403; 428/406
[58] Field of Search ............... 428/333, 363, 403, 406, 428/432

[56] References Cited

U.S. PATENT DOCUMENTS 4,373,013  2/1983  Yoshigumi .................... 428/403

FOREIGN PATENT DOCUMENTS

| 9806 | 1/1978 | Japan | 428/406 |
| 9807 | 1/1978 | Japan | 428/406 |
| 137488 | 10/1979 | Japan | 428/403 |
| 25363 | 2/1983 | Japan | 428/403 |

Primary Examiner—William J. Van Balen
Attorney, Agent, or Firm—Flynn, Thiel, Boutell & Tanis

[57] ABSTRACT

The material obtained by coating a small plate substrate with a metal oxide doped with different metals is light permeable as well as conductive, wherein said plate substrate is selected from mica, illite, bravaisite, kaolinite, bentonite, montmorillonite, smectites, calcium phosphate and glass particle and its ratio of major axis to minor axis is 1–30 and its ratio of minor axis to thickness is 5 or more. This material is useful as the additive for providing a transparent film with conductivity.

8 Claims, No Drawings

LIGHT PERMEABLE CONDUCTIVE MATERIAL

BACKGROUND OF THE INVENTION

The present invention relates to a light permeable conductive material, in particular relates to a material which, when compounded with a transparent synthetic resin films or paints, is capable of providing a film or paint film with a superior conductivity without spoiling the transparency of said film or paint film.

In recent years, transparent as well as conductive films and paints have been utilized widely in the manufacture of display electrodes, protective films, antistatic films, transparent illuminants and the like. As typical examples of materials which are capable of providing films and paints with conductivity, there can be enumerated metallic powders or carbon powders. However, since they themselves are inherently metallic or black colored, assuming colores they can not maintain the transparency of films and paint films even if they can provide them with conductivity. As the material which is transparent and further conductive, there is a powder obtained by doping tin oxide with antimony. However, as the average particle diameter of this powder is very fine such as 0.1 micron or less, it is difficult to disperse this powder uniformly in the resin or paint, furthermore there is the disadvantage that since said powder is dispersed in the resin or paint while making microvoids of the powders embrace air therein on dispersing, the transparency of the film or paint film is spoiled and the conductivity does not increase to a satisfactory degree. In this connection, it is to be noted that so far as the conductivity alone is concerned, the conductivity can be enhanced by increasing the compounding amount of the tin oxide powder doped with antimony, but in this case the transparency of the film or paint film is further deteriorated.

SUMMARY OF THE INVENTION

The present invention intends to provide a light permeable conductive material which is different in type from the conventional powder material obtained by doping the tin oxide with antimony. The material according to the present invention is characterized in that the surface of a light permeable plate substance is coated with a conductive substance, and the thickness of said coated layer is designed to be in the range of 70–1200 angstrom unit.

DETAILED DESCRIPTION

In the present invention, the plate substance functions as a substrate for the conductive substance, and there is generally used the plate substrate whose major axis is in the range of 0.1–100 micron, whose major axis/minor axis ratio is in the range of 1–30, and those minor axis/thickness ratio is 5 or more. However, the dimensions of the plate substrate may be selected suitably depending on the usage of the material according to the present invention. For instance, in case where the material according to the present invention is compounded with the paint so that the thickness of the paint film may be 10 micron or less, it is suitable that the thickness of the plate substrate should be 1 micron or less, preferably 0.5 micron or less, and the major axis should be 1–50 micron, preferably 30 micron or less, while in case where the thickness of the paint film is desired to be 10 micron or more, it is preferable that the plate substrate whose thickness is 10 micron or less and whose major axis is 1–100 micron, desirably 1–50 micron should be used. Furthermore, when the material of the present invention is compounded with plastics to make a film, in case the thickness of said film is 10 micron or less it is desirable that the plate substance should be 1 micron or less thick and the major axis should be 10 micron or less, preferably 0.5–10 micron, while in case the thickness of said film is 10 micron or more the thickness of the plate substance should be 1/10 or less of the film thickness.

Generally speaking, in order that a light permeable substance, even when ground, may remain light permeable, it is necessary that the dimensions of said substance should bring about no scattering of light, in more detail, the particle diameter of said substance should be less than ½ of the wavelength of light, namely $D_p \leq 0.4$ micron. However, the fine substance like this is liable to aggregate in a liquid medium and its redispersion is also difficult. And, a spherical particle, even if conductive, has a narrow surface area as compared with different-shaped particles, and accordingly the probability of spherical particles contacting mutually is also low. Therefore, when intending to compound conductive spherical particles for instance with a film for providing said film with conductivity, it is impossible to render the film conductive satisfactorily without considerably increasing the amount of particles to be compounded.

In the material of the present invention, contrarily, as the substrate, as referred to afterwards, is thin and plate like and further the conductive substance coating this substrate is extremely thin, there is no possibility of even the light perpendicular to the direction of thickness being scattered. In addition, as the material is plate like, the probability of materials contacting mutually is high as compared with the spherical particles, and accordingly it becomes possible to render the film conductive even when the amount of the material of this invention to be compounded is smaller.

The plate substrate used for the present invention is itself required to be light permeable. The term used herein "light permeable plate substrate" or "light-transmittable plate substrate" implies such a plate substrate that when 2 wt % of the plate substance and 98 wt % of ethylene glycol are mixed, the resulting mixture is placed in a quartz cell having 1 mm of optical path length, and its transmittance is measured by means of a hazemeter manufactured by SUGA Tester K.K. in Japan on the basis of the standard of ASTM D 1003, the transmittance is evaluated to be 80% or more. The quality of the plate substrate used in the present invention is not called in question so far as it is light permeable. However, it is preferable that the refractive index of said plate substance should be in the range of 1.5–2.5. Accordingly, as the concrete examples of the plate substrate used suitably for the present invention there can be enumerated natural and synthetic mica, illite, bravaisite, kaolinite, bentonite, montmorillonite, smectites, calcium phosphate, thin glass plates, and the like.

According to the invention, the surface of the light transmittable plate substrate is coated with a conductive substance. The thickness of the coated layer is in the range of 70–1200 angstrom unit, preferably in the range of 200–1000 angstrom unit. The reason is that in case the thickness of the coated layer is less than 70 angstrom unit it is impossible to provide the material of the present invention with a predetermined conductivity, and in case the thickness of the coated layer is over 1200 angstrom unit the transparency of the material deteriorates.

In this connection, it is to be noted that when 2 wt % of the material and 98 wt % of ethylene glycol are mixed and this mixture is measured with reference to the transmittance according to the same procedure employed in the case of the mixture of aforesaid plate substance and ethylene glycol, the transmittance is 30% or more.

The conductive coating according to the present invention includes metal oxides doped with different kind of metals. Concretely, there are enumerate tin oxide system ones such as tin oxides doped with antimony of 0.1-30 wt %, preferably 3-15 wt % and tin oxides doped with antimony of 0.1-15 wt %, preferably 5-15 wt % and tellurium of 0.01-5 wt % preferably 0.05-0.5 wt %, and further indium oxide system ones such as indium oxides doped with 0.1-20 wt % of tin. In addition thereto, for instance $CdSnO_3$, $Cd_2SnO_4$, $In_2TeO_6$, $CdIn_2O_4$, $CdIn_{(2-x)}Sn_xO_4$ ($x=0.001-0.2$), $Cd_2Sn_{(1-x)}Sb_xO_4$ ($x=0.001-0.1$), $In_2Te_{0.98}Re_{0.02}O_6$ and the like may be used as the conductive substance of the present invention.

Furthermore, explanation will be made on the process of preparing the light permeable or transmittable conductive material according to the present invention. Basically, the light permeable conductive material according to the present invention is prepared by the steps of depositing uniformly a precursor of said conductive substance in the form of metal hydroxide on the surface of said transparent plate substrate, thereafter washing and drying the plate substrate coated with said metal hydroxide, and further calcining the same at a temperature of 350°-850° C.

For instance, referring to the case of coating mica with a tin oxide doped with antimony, there is first prepared for a mica dispersion obtained by dispersing a previously boiled mica in an aqueous hydrochloric acid solution. On the other hand, fixed amounts of tin chloride and antimony chloride are dissolved in concentrated hydrochloric acid, and this solution is dropped slowly in said mica dispersion and mixed. Owing to this dropping, said metal chlorides are converted into metal hydroxides. During this dropping operation, it is preferable that the temperature and pH in the system should be controlled so that the metal chloride and metal hydroxide dissolved in the mixed solution may be held in a supersaturated state. The reason for this is that when the aforesaid supersaturated state is always held in the system, slow dropping of the concentrated hydrochloric solution of metal chlorides destroys this supersaturated state temporarily and precipitates from the solution fine metal hydroxides in that degree, whereby the metal hydroxides can be deposited selectively as well as uniformly on the surface of the mica i.e, the plate substrate.

EXAMPLE 1

80 g of mica (which is called Mica A hereinafter) was dispersed in 1500 cc of water, said mica A being subjected to boiling previously and having a major axis of 10-30 micron, a minor axis of 1-30 micron and thickness of 0.1-0.3 micron. The pH of this dispersion was controlled with a hydrochloric acid to be 1.6. On the other hand, 93 g of $SnCl_4.5H_2O$ and 9.4 g of $SbCl_3$ were dissolved in 350 cc of a concentrated hydrochloric acid. This solution was dropped in said mica dispersion in 10 hours and mixed. At this time, the temperature of this mixed solution was always held at 50° C., the pH thereof was always held at 1.6, and the metal chlorides and metal hydroxides dissolved in the mixed solution were held in a supersaturated state respectively.

After the completion of dropping, Mica A was taken out of the solution, washed, further dried and thereafter calcined at 650° C., whereby there was obtained the material of the present invention. This material was the one which coating said mica with about 700 angstrom thick layer of a conductive substance made of a tin oxide doped with 10.8 wt % of antimony. The transmittance was measured with reference to a mixture of 2 wt % of this material and 98 wt % of ethylene glycol according to the same procedure as aforesaid. The measured value was 48%. Further, 10 volume % of this material was mixed with the cold-setting epoxy resin manufactured by Buehler Co. and the volume resistivity was measured. The measured value was $1.5 \times 10^6$ ohm-.centimeter.

On the other hand, the material of the present invention with a thin glass plate as the substrate was obtained according to the exactly same procedure as aforesaid except that Mica A was replaced by a thin glass plate having a major axis of 40 micron, a minor axis of 10-40 micron and a thickness of micron and 70 hours" dropping was employed. The coat thickness of this material was about 700 angstrom unit, and the transmittance and volume resistivity thereof were measured to be 45% and $5 \times 10^7$ ohm.centimeter respectively according to the same measuring method as aforesaid.

EXAMPLE 2

80 g of Mica A used in Example 1 was dispersed in 1500 cc of water. The pH of this dispersion was controlled to be 1.3 by using hydrochloric acid. On the other hand, 93 g of $SnCl_4.5H_2O$, 7.2 g of $SbCl_3$ and 0.3 g of $TeCl_4$ were dissolved in 350 g of a concentrated hydrochloric acid. This solution was dropped in said mica dispersion in 10 hours slowly and mixed. At this time, the temperature of this mixed solution was always held at 50° C., the pH thereof was always held at 1.3, and the metal chlorides and metal hydroxides dissolved in the mixed solution were held in a supersaturated state respectively.

After the completion of dropping, the mica was taken out of the solution, washed further dried and thereafter calcined at 650° C., whereby there was obtained the material of the present invention. This material was the one which comprises coating the mica with about a 700 angstrom thick layer of a conductive substance made of a tin oxide doped with 8.5 wt % of antimony and 0.3 wt % of tellurium. The transmittance and the volume resistivity thereof were measureed to be 50% and $1.2 \times 10^6$ ohm centimeter respectively according to the same measuring method employed in Example 1.

EXAMPLE 3

100 g of Mica A used in Example 1 was dissolved in 1500 cc of water, and the pH of this dispersion was controlled to be 4.5 by using hydrochloric acid. On the other hand, 161.6 g of $InCl_3$ and 16.3 g of $SnCl_4.5H_2O$ were dissolved in 500 cc of pure water. This dissolved solution was dropped in said mica dispersion slowly in 15 hours and mixed. At this time, the temperature of this solution was always held at 40° C., the pH thereof was always held at 4.5, and the metal chlorides and metal hydroxides dissolved in the mixed solution were held in a supersaturated state respectively.

After the completion of dropping, the mica was taken out of the solution, washed, further dried and thereafter calcined at 650° C., whereby there was obtained the material of the present invention. This material was the one which comprises coating said mica with about a 650 angstrom thick layer of a conductive substance made of an indium oxide doped with 5.1 wt % of tin. The transmittance and the volume resistivity thereof were measured to be 53% and $1.4 \times 10^5$ ohm. centimeter respectively according to the same measuring method as employed in Example 1.

EXAMPLE 4

100 g of mica A used in Example 1 was dispersed in 1500 cc of water, and the pH of this dispersion was controlled to be 9.5 by using potassium hydroxide. On the other hand, 64 g of $K_2SnO_3.3H_2O$ and 22 g of $SbO.KC_4H_4O_6.\frac{1}{2}H_2O$ were dissolved in 300 cc of water. This solution was dropped in said mica dispersion slowly in 4 hours and mixed. At this time, the temperature of the mixed solution was held always at 60° C., the pH of the mixed solution was held always in the range of 9.4–9.6, and the metallic compounds and the metal hydroxides dissolved in the mixed solution were held in a supersaturated state respectively.

After the completion of dropping, the mica was taken out of the solution, washed, further dried and thereafter calcined at 650° C., whereby there was obtained the material of the present invention. This material was the one which comprises coating the mica with about a 700 angstrom thick layer of a conductive substance made of tin oxide doped with 18.7 wt % of antimony. The transmittance and the volume resistivity thereof were measured to be 45% and $4.5 \times 10^6$ ohm.centimeter respectively according to the same measuring method as employed in Example 1.

EXAMPLE 5

200 g of Mica A used in Example 1 was dispersed in 1000 cc of water, and the pH of this dispersion was controlled to be 9.0 by using aqueous ammonia. On the other hand, 89.9 g of $CdCl_2$ and 86.1 g of $SnCl_4.5H_2O$ were dissolved in 500 cc of water. This solution was dropped in said mica dispersion slowly in 10 hours and mixed. At this time, the temperature of the mixed solution was held always at 60° C., the pH of the mixed solution was held always at 9.0, and the metal chlorides and the metal hydroxides dissolved in the mixed solution were held in a supernatured state respectively.

After the completion of dropping, the mica was taken out of the solution, washed, further dried and thereafter calcined at 650° C., whereby there was obtained the material of the present invention. This material was the one which comprises coating the mica with about a 700 angstrom thick layer of a conductive substance made of 63 wt % of cadmium oxide and 37 wt % of tin oxide. The transmittance and the volume resistivity thereof were measured to be 40% and $3 \times 10^7$ ohm.centimeter respectively according to the same measuring method as employed in Example 1.

EXAMPLE 6

100 g of the same thin glass plates as used in Example 1 was dispersed in 1500 cc of water, and the pH of this dispersion was controlled to be 1.8 by using hydrochloric acid. On the other hand, 72.4 g of $SnCl_2.2H_2O$ and 7.7 g of $SbCl_3$ were dissolved in 1000 cc of a concentrated hydrochloric acid. Further, 16.4 g of $KClO_3$ was dissolved in 1000 cc of water. These solutions were dropped in said thin glass plates dispersing slowly in 70 hours and mixed. At this time, the temperature and pH of this mixed solution were held constantly at 90° C. and 1.8 respectively, and the metal chlorides and the metal hydroxides dissolved in the mixed solution were held in a supernatured state respectively.

After the completion of dropping, the thin glass plates were taken out of said solution, washed, further dried, and thereafter calcined at 650° C., whereby there was obtained the material of the present invention. This material was the one which comprises coating said thin glass plates with about a 750 angstrom thick layer of a conductive substance made of a tin oxide doped with 7.6 wt % of antimony, and was observed to have the transmittance of 47% and the volume resistivity of $4.7 \times 10^7$ ohm.centimeter according to the same measuring method as employed in Example 1.

EXAMPLE 7

480 g of Mica A used in Example 1 was dispersed in 1500 cc of water, and the pH of this dispersion was controlled to be 1.8 by using a hydrochloric acid. Furthermore, 59.9 g of $SnCl_2.2H_2O$ and 9.4 g of $SbCl_3$ were dissolved in 350 cc of hydrochloric acid. Still further, 13.6 g of $KClO_3$ was dissolved in water. These solutions were dropped in said mica dispersion slowly in 10 hours and mixed. At this time, the temperature and pH of the mixed solution were held always at 95° C. and 1.8 respectively, and the metal chlorides and metal hydroxides dissolved in the mixed solution were held in a supernatured state.

After the completion of dropping, said mica was taken out of the solution, washed, further dried, and thereafter calcined at 650° C. Thus, the material of the present invention was obtained. This material was the one which comprises coating the mica with about a 700 angstrom thick layer of a conductive substance made of a tin oxide doped with 10.8 wt % of antimony. The transmittance and the volume resistivity thereof were measured according to the same measuring method as employed in Example 1 to show 45% and $1.5 \times 10^6$ ohm. centimeter respectively.

EXAMPLE 8

By repeating the same procedure as used in Example 1 except that only the amounts of metal chlorides, that is, the amounts of $SnCl_4.5H_2O$ and $SbCl_3$ were changed into 151.9 g and 10.3 g respectively, there was obtained the material according to the present invention. This material was the one which comprises coating the mica with a 1100 angstrom unit-thick conductive substance made of a tin oxide doped with 5.5 wt % of antimony. This material was subjected to the measuring method as employed in Example 1 to show the results that the transmittance was 35% and the volume resistivity was $7.5 \times 10^5$ ohm.centimeter.

EXAMPLE 9

3 g of bentonite supplied from Bentnite Kogyo K.K. in Japan was dispersed in 1000 g of pure water. Said bentonite was swelled thereby to have an average major axis of 1 micron, an average minor axis of 1 micron, and an average thickness of 60 angstrom unit. On the other hand, a solution was prepared by dissolving 239.34 g of $SnCl_4.5H_2O$ and 24.15 g of $SbCl_3$ in 600 g of a 15 wt % hydrochloric acid. This solution was dropped in said bentonite dispersion slowly in 6 hours and mixed. During this drop-mixing operation, the temperature and pH of this mixed solution were held always at 30° C. and 2.0 respectively.

After the completion of dropping, a solid matter was separated from the solution, washed, dried and thereafter calcined at 650° C. The thus obtained material was the one which comprises coating the bentonite with a 250 angstrom thick layer of a conductive substance made of a tin oxide doped with a 10.8 wt % antimony. The transmittance and volume resistivity of this material were measured according to the same measuring method as employed in Example 1 to show 30% and $4 \times 10^7$ ohm.centimeter respectively.

EXAMPLE 10

3 g of synthetic smectites supplied from Kunimine Kogyo K.K. in Japan was dispersed in 1000 g of pure water. Said synthetic smectites were swelled thereby to have an average major axis of 0.5 micron, an average minor axis of 0.5 micron and an average thickness of 50 angstrom unit. On the other hand, a solution was prepared by dissolving 239.34 g of $SnCl_4 \cdot 5H_2O$ and 24.15 g of $SbCl_3$ in 600 g of a 15 wt % hydrochloric acid. This solution was dropped in said synthetic smectites dispersion slowly in 6 hours and mixed. During this drop-mixing operation, the temperature and pH of this mixed solution were held always at 30° C. and 2.0 respectively.

After the completion of dropping, a solid matter was separated from the solution, washed, dried and thereafter calcined at 650° C. The thus obtained material was the one which comprises coating the synthetic smectites with a 200 angstrom thick layer or conductive substance made of a tin oxide doped with a 10.8 wt % antimony. This material was measured according to the same measuring method as employed in Example 1 to find that the transmittance was 35% and the volume resistivity was $7 \times 10^7$ ohm.centimeter.

What is claimed is:

1. A light permeable, electrically conductive material which comprises a substantially flat, plate-like, light permeable particulate substrate which permits a high amount of contact between like substrate particles, wherein the major axis of said substrate is from 0.1 to 100μ, the ratio of major axis:minor axis is from 1 to 30:1 and the ratio of the minor axis:thickness of said substrate is 5:1 or greater,
    said substrate being coated with a conductive layer made of a metal oxide doped with a different kind of metal,
    said conductive layer having thickness of 70 to 1200 angstroms.

2. A conductive material according to claim 1 wherein said plate substrate is any one of natural or synthetic mica, illite, bravaisite, kaolinite, bentonite, montmorillonite, smectites, calcium phosphate and thin glass plates.

3. A conductive material according to claim 1 wherein said conductive layer is formed of any one of tin oxides doped with 0.1–30 wt % of antimony, tin oxides doped with 0.1–15 wt % of antimony and 0.01–5 wt % of tellurium, and indium oxides doped with 0.1–20 wt % of tin.

4. A conductive material according to claim 1 wherein said conductive layer is formed of any one of $CdSnO_3$, $Cd_2SnO_4$, $In_2TeO_6$, $CdIn_2O_4$, $CdIn_{(2-x)}Sn_xO_4$ (x=0.001–0.2), $Cd_2Sn_{(1-x)}Sb_xO_4$ (x=0.001–0.1) and $In_2Te_{0.98}Re_{0.02}O_6$.

5. A light permeable-conductive material according to claim 1, wherein said material is compounded with paints, plastics or epoxies to form a light-permeable conductive film.

6. A light permeable, electrically conductive material as claimed in claim 1, comprising a small, plate-like, light permeable particulate substrate coated with a layer of conductive material comprising tin oxides doped with antimony, tin oxides doped with antimony and tellurium or indium oxides doped with tin, obtained by boiling said substrate in water, then dispersing it in an aqueous hydrochloric acid solution, then slowly dropping predetermined amounts of the desired metals of the coating in their chloride form dissolved in concentrated hydrochloric acid to cause them to be deposited on said substrate in a metal hydroxide form while said dispersion is mixed and the dispersion temperature and pH are controlled to keep the metal solution in a supersaturated state, then washing, drying and finally calcining said coated substrate particles to convert said metal hydroxide coating to a metal oxide coating.

7. A light permeable, electrically conductive material which comprises a substantially flat, plate-like, light-permeable, particulate substrate having a transmittance of 80% or more and which permits a high amount of contact between like substrate particles, wherein the major axis of said substrate is from 0.1 to 100μ, the ratio of major axis:minor axis is from 1 to 30:1 and the ratio of minor axis:thickness of said substrate is 5:1 or greater, said substrate being a material selected from the group comprising natural mica, synthetic mica, illite, bravaisite, kaolinite, bentonite, montmorillonite, smectites, calcium phosphate and thin glass plates,
    said substrates being coated with a conductive layer selected from the group consisting of tin oxides doped with 0.1 to 30 wt. % of antimony, tin oxides doped with 0.1 to 15 wt. % of antimony and 0.01 to 5 wt. % of tellurium, and indium oxides doped with 0.1 to 20 wt. % of tin,
    said conductive layer having a thickness of 70 to 1200 Angstroms.

8. A light permeable, electrically conductive material which comprises a substantially flat, plate-like, light-permeable particulate substrate having a transmittance of 80% or more and which permits a high amount of contact between like substrate particles, wherein the major axis of said substrate is from 0.1 to 100μ, the ratio of major axis:minor axis is from 1 to 30:1 and the ratio of minor axis:thickness of said substrate is 5:1 or greater, said substrate being a material selected from the group comprising natural mica, synthetic mica, illite, bravaisite, kaolinite, bentonite, montmorillonite, smectites, calcium phosphate and thin glass plates,
    said substrate being coated with a conductive layer selected from the group consisting of $Cd\, Sn\, O_3$, $Cd_2\, Sn\, O_4$, $In_2\, Te\, O_6$, $Cd\, In_2\, O_4$, $Cd\, In_{(2-x)}\, Sn_x\, O_4$ wherein x=0.001 to 0.2, $Cd_2\, Sn_{(1-x)}\, Sb_x\, O_4$ wherein x=0.001 to 0.1 and $In_2\, Te_{0.98}\, Re_{0.02}\, O_6$,
    said conductive layer having a thickness of 70 to 1200 Angstroms.

* * * * *